United States Patent
Srikanth et al.

(10) Patent No.: US 12,553,741 B2
(45) Date of Patent: Feb. 17, 2026

(54) SYSTEM AND METHOD TO ADDRESS LOCALIZATION ERRORS

(71) Applicant: Rivian IP Holdings, LLC, Plymouth, MI (US)

(72) Inventors: Sukruth Srikanth, Amherstburg (CA); Xuehao Li, Santa Clara, CA (US); Jeffrey Mitsuo Ota, Morgan Hill, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 175 days.

(21) Appl. No.: 17/937,889

(22) Filed: Oct. 4, 2022

(65) Prior Publication Data

US 2024/0110812 A1 Apr. 4, 2024

(51) Int. Cl.
*G01C 21/00* (2006.01)
*G01W 1/10* (2006.01)
*G07C 5/08* (2006.01)

(52) U.S. Cl.
CPC ....... *G01C 21/3885* (2020.08); *G01C 21/387* (2020.08); *G07C 5/0841* (2013.01); *G01W 1/10* (2013.01)

(58) Field of Classification Search
None
See application file for complete search history.

(56) References Cited

U.S. PATENT DOCUMENTS

| | | | |
|---|---|---|---|
| 2016/0007209 A1* | 1/2016 | Hohs | G01C 21/3841 455/423 |
| 2016/0110928 A1* | 4/2016 | Bin Kenaid | G07F 17/24 705/13 |
| 2017/0052028 A1* | 2/2017 | Choudhury | G01C 21/165 |
| 2017/0074659 A1* | 3/2017 | Giurgiu | G01S 19/41 |
| 2018/0373941 A1* | 12/2018 | Kwant | G08G 1/0145 |
| 2019/0016340 A1* | 1/2019 | Bae | B60W 30/18109 |
| 2019/0088148 A1* | 3/2019 | Jacobus | B60W 10/18 |
| 2019/0184986 A1* | 6/2019 | Hovasapyan | G08G 1/167 |
| 2019/0186947 A1* | 6/2019 | Rockmore | B60W 60/00 |
| 2020/0142402 A1* | 5/2020 | Mitchell | H04W 4/40 |
| 2020/0377078 A1* | 12/2020 | Liu | B60W 60/0053 |
| 2022/0007131 A1* | 1/2022 | Ivanov | G01S 5/0072 |
| 2022/0179424 A1* | 6/2022 | Donath | G01C 21/3407 |
| 2023/0115240 A1* | 4/2023 | Sidhu | B60W 60/0053 701/25 |

\* cited by examiner

*Primary Examiner* — James J Lee
*Assistant Examiner* — Melanie G Huber
(74) *Attorney, Agent, or Firm* — Foley & Lardner LLP

(57) ABSTRACT

Overcoming localization errors in geographic regions where a global positioning system signal is obstructed is provided. A system can identify a geographic location with a localization error. In response, the system can supplement the global positioning system data associated with the geographic location with supplemental data to generate supplemental global positioning system data. Additionally, an operational state of a vehicle is controlled based on the supplemental global positioning system data.

20 Claims, 8 Drawing Sheets

SYSTEM AND METHOD TO ADDRESS LOCALIZATION ERRORS

INTRODUCTION

Electric vehicles can receive and use information to perform a variety of vehicle operations.

SUMMARY

Aspects of this technical solution can be directed to identifying and overcoming localization errors. In particular, aspects of this technical solution can identify geographic locations where receipt of a GPS signal at an electric vehicle is obstructed. Such a geographic location can be said to be exhibiting a localization error. Localization errors can be dynamic in nature such that the geographic location can exhibit a localization error at a first time and may not exhibit the localization error at a second time. Responsive to identifying the geographic location as exhibiting a localization error, GPS data can be supplemented by determining a current location of the electric vehicle in other ways to increase accuracy and reliability. The current location can be determined using user cellphones in the electric vehicle using, for example, cellphone tower triangulation. The current location can be determined using a Subscriber Identity Module (SIM) of the electric vehicle using, for example, cellphone tower triangulation. The current location can be determined using one or more sensors located on the electric vehicle. A GPS map associated with the electric vehicle can be updated at a higher frequency to identify geographic locations that exhibit localization errors. A notification can be sent to a user alerting the user of a localization error. For example, a notification can be sent to a user alerting the user that a navigation route passes through a geographic location exhibiting a localization error. A current operational state of the electric vehicle can be maintained or changed based upon the identified localization errors. Real-time sensor data received from one or more sensors on the electric vehicle can be compared with GPS map data to identify discrepancies between the sensor data and the GPS map data. One or more actions can be taken responsive to identifying a discrepancy. The actions can include requesting an update of the GPS map to include the sensor data. The actions can include overriding the GPS map data with sensor data. The actions can include overriding the sensor data with the GPS map data, and the actions can include reinforcing the GPS map data with the sensor data.

At least one aspect is directed to a system including a data processing system having one or more processors, coupled with memory. The data processing system can identify a geographic location with a localization error, wherein the geographic location and the localization error are identified based on GPS data. In response to identifying the localization error, the data processing system can obtain supplemental data associated with the geographic location and generate supplemental GPS data associated with the geographic location, wherein the supplemental GPS data includes the supplemental data associated with the geographic location. The data processing system can facilitate control of an operational state of a vehicle based on the supplemental GPS data.

At least one aspect is directed to a method includes identifying, by a data processing system having one or more processors coupled with a memory, a geographic location with a localization error, wherein the geographic location and the localization error are identified based on global positioning system (GPS) data. In response to identifying the localization error, the method can include obtaining, by the data processing system, supplemental data associated with the geographic location and generating, by the data processing system, supplemental GPS data associated with the geographic location, wherein the supplemental GPS data includes the supplemental data associated with the geographic location. The method can include facilitating, by the data processing system, control of an operational state of a vehicle based on the supplemental GPS data.

At least one aspect is directed to a system including a data processing system having one or more processors, coupled with memory. The data processing system can identify a geographic location exhibiting a localization error, wherein the geographic location and the localization error are identified based on global positioning system (GPS) data. The data processing system can determine that a route of a vehicle passes through the geographic location. In response to identifying the localization error and determining that the route passes through the geographic location, the data processing system can obtain supplemental data associated with the geographic location, generate supplemental GPS data associated with the geographic location, wherein the supplemental GPS data includes the supplemental data associated with the geographic location, and navigate the route based on the supplemental GPS data.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
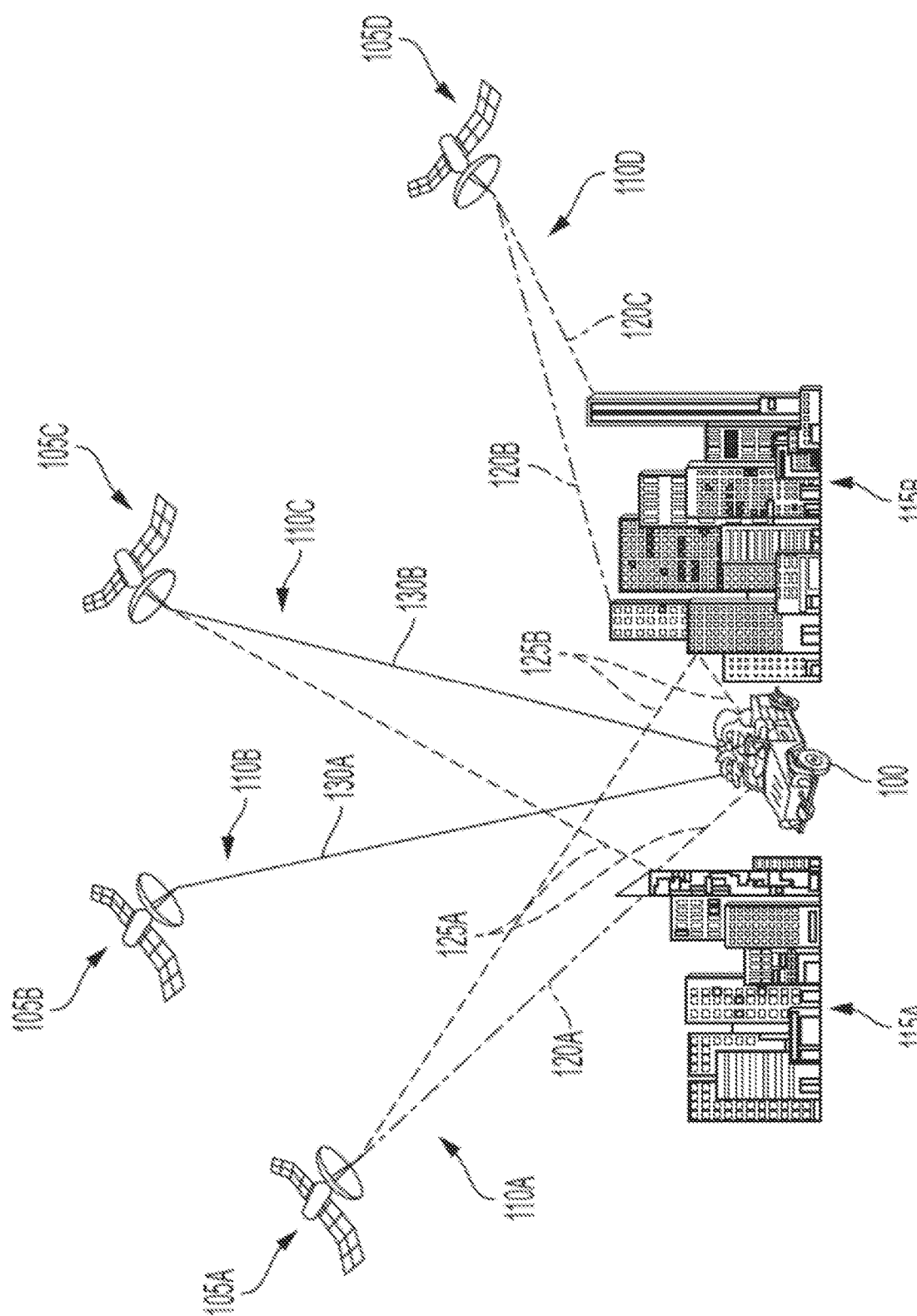
FIG. 1 depicts an example diagram showing how reception of GPS signals at an electric vehicle can be obstructed, in accordance with some aspects.

Following below are more detailed descriptions of various concepts related to, and implementations of, methods, apparatuses, and systems of overcoming localization errors. The various concepts introduced above and discussed in greater detail below can be implemented in any of numerous ways.

This disclosure is generally directed to electric vehicles, and particularly, to improving the accuracy of GPS data when GPS signals received by the electric vehicles are obstructed. As electric vehicles drive around, in some circumstances, the GPS signal received by the electric vehicles can be obstructed. Generally speaking, the GPS includes a network of satellites, for example, twenty four satellites, that circle the earth. These satellites transmit GPS signals including location data back to earth on a continuous basis. Each electric vehicle can be fitted with a GPS device that intercepts the GPS signals from the GPS satellites. From the GPS signals, the electric vehicle can determine a current location of the electric vehicle, for example, by trilateration or triangulation. The electric vehicle can use the current location for a variety of purposes, for example, to navigate the electric vehicle from a source location to a destination location.

The GPS signals received by the electric vehicle can become obstructed. For example, driving through hilly or mountainous terrains, tunnels, national parks, cities, dense canopy of trees, tall buildings, and other features can obstruct or prevent the GPS signals from reaching the electric vehicle. Weather conditions such as thunderstorms, sandstorms, fog, rain, mist, snow, hail, time of day, seasons, traffic, off-road sites, and other conditions can obstruct the GPS signals from reaching the electric vehicle. When the GPS signal from the satellites is obstructed, the electric vehicle can be prevented from accurately determining the current location of the electric vehicle, which in turn can adversely impact certain operations of the electric vehicle. For example, when the GPS signal is obstructed and the electric vehicle is not able to accurately determine the current location of the electric vehicle, navigational features of the electric vehicle can become inaccurate, unreliable, or otherwise malfunction.

The disclosed solutions have a technical advantage of improving the operation of the electric vehicle. Specifically, the disclosed solutions have a technical advantage of identifying geographic locations where the GPS signal is obstructed, as well as improving the accuracy of location data in those geographic locations. By improving the accuracy of the location data, an operational state of the electric vehicle can either be maintained or changed.

Systems and methods of the present technical solution, thus, address situations of GPS signal obstruction. In particular, the technical solution provides a mechanism to dynamically identify geographic locations where the GPS signal is obstructed. Such geographic locations can be said to exhibit a "localization error." Responsive to identifying localization errors, the technical solutions proposed herein help to reinforce GPS data with supplemental data to improve accuracy and reliability of the GPS data. For example, GPS maps that assist with navigation can be updated at a higher frequency to identify the localization errors on those GPS maps. Location data from other sources can be determined for supplementing the GPS data. For example, a current location can be determined from a cell phone of a user in the electric vehicle, using the SIM card of the electric vehicle, or sensors located on the electric vehicle can provide real-time sensor data of the surroundings of the electric vehicle. The current location can be determined in other ways. Such supplemental GPS data can then be used to change or maintain a current operational state of the electric vehicle.

FIG. 1 depicts an example electric vehicle 100 that receives GPS signals from one or more GPS sources 105A-105D, in accordance with some aspects. Each of the GPS sources 105A-105D can be a GPS satellite. One or more of the GPS sources 105A-105D can be other types of sources that can provide positioning, navigation, or timing services. Each of the GPS sources 105A-105D can transmit or broadcast one or more GPS signals 110A-110D, respectively. One or more of the GPS signals 110A-110D can include ranging signals or data that can be used by the electric vehicle 100 to determine a current location of the electric vehicle. The current location of the electric vehicle 100 can include a variety of data points including, for example, a Latitude, Longitude, and Altitude ("LLA") of the electric vehicle, a Yaw, Pitch, and Roll ("YPR") of the electric vehicle, and vehicle acceleration or speed. The current location can include other or additional data points. Although four of the GPS sources 105A-105D are shown herein, the number of GPS sources can vary from that shown.

As the electric vehicle 100 drives around, the GPS signals 110A-110D from the GPS sources 105A-105D can become obstructed. As an example, large or dense buildings 115A, 115B can obstruct the receipt of one or more of the GPS signals 110A-110D by the electric vehicle 100. For example, GPS signals 120A, 120B, and 120C, which are obstructed by the buildings 115A and 115B, can be considered blocked signals. Blocked signals can prevent receipt of the GPS signals 120A-120C at the electric vehicle 100, and therefore, the information coded in those GPS signals can be unavailable to the electric vehicle. GPS signals 125A and 125B can be obstructed and reflected by the buildings 115A and 115B before reaching the electric vehicle 100. Such GPS signals can be considered indirect signals. The indirect signals can be considered to provide inaccurate information to the electric vehicle 100. Blocked and indirect GPS signals are both considered obstructed GPS signals.

GPS signals 130A and 130B that reach the electric vehicle 100 unobstructed can be considered direct signals and can be considered to provide accurate information to the electric vehicle. A GPS signal that is obstructed under some circumstances can become unobstructed in other circumstances. A GPS signal that is unobstructed under some circumstances can become obstructed in other circumstances. The buildings 115A and 115B are used only as an example herein. Other features can cause the GPS signal 110A-110D to become obstructed. For example, national parks, tunnels, shadow of mountains, hills, valleys, adverse weather conditions (e.g., thunderstorms, fog, rain, snow), off road sites, and traffic density (e.g., a large vehicle blocking the GPS signal), and other features and conditions can cause the GPS signal 110A-110D to become obstructed.

Such geographic regions or locations where the GPS signals 110A-110D are obstructed can be said to exhibit localization errors. In other words, if no GPS signal is received (e.g., with blocked signals) at the electric vehicle 100 at a geographic location or if the power level or other designated parameter of the GPS signals 110-A-110D received at the electric vehicle at a geographic location is below a predetermined threshold, that geographic location can be said to exhibit a localization error. The power level of the GPS signals 110A-110D can be measured in decibel milliwatts (dBm or dBmW). The power level of the GPS signals 110A-110D can be measured in other units.

Figure 2:
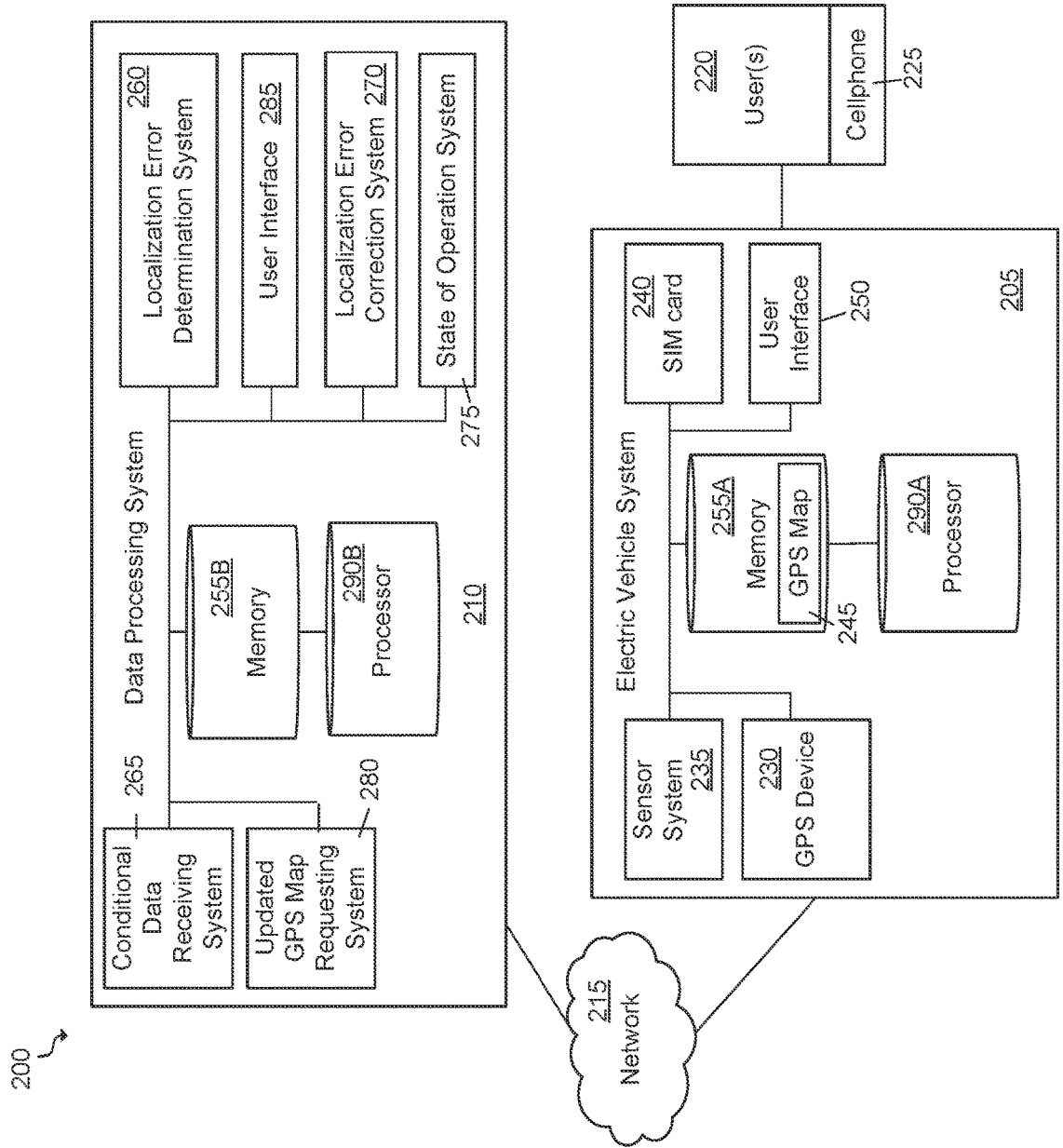
FIG. 2 depicts an example block diagram for a system to overcome localization errors by the electric vehicle of FIG. 1, in accordance with some aspects.

FIG. 2 depicts an example block diagram of a system 200 that can be used to identify and overcome localization errors, in accordance with some aspects. The system 200 includes an electric vehicle system 205 interfacing with a data processing system 210 via a network 215. The network 215 can include any of a variety of suitable computer networks such as the Internet, local, wide, metro, or other area networks, intranets, cellular networks, satellite networks, radio networks, voice or data mobile telephone networks, and other types of wired or wireless communication networks. The network 215 can be public or private. The electric vehicle system 205 can be associated with (e.g., be part of) the electric vehicle 100. The electric vehicle system 205 can be associated with one or more users 220 (e.g., a driver or one or more passengers) in the electric vehicle 100, and one or more of those users can have a cellphone 225 with GPS capability. One or more of the users 200 can have other or additional portable devices (e.g., laptops, personal digital assistants, smart watches, other types of smart technology) that can provide GPS capability.

The electric vehicle system 205 can include a GPS device 230, a sensor system 235, a SIM card 240, a GPS map 245, and a user interface 250. The electric vehicle system 205 can include other or additional elements that can be considered desirable to have in performing the functions described herein. The electric vehicle system 205 can include other or additional elements that can be needed or considered desirable to have in operating the electric vehicle 100.

The GPS device 230 can be a real-time GPS tracking system that intercepts or receives the GPS signals 110A-110D. The GPS device 230 can be associated with a GPS antenna on the electric vehicle 100 to intercept the GPS signals 110A-110D. In response to intercepting the GPS signals 110A-110D, the GPS device 230 can identify the current location of the electric vehicle 100. For example, in response to receiving the GPS signals 110A-110D, the GPS device 230 can identify the LLA or YPR of the electric vehicle 100. The GPS device 230 can identify other or additional information from the GPS signals 110A-110D. Based on at least the LLA or YPR, the GPS device 230 can identify the current location of the electric vehicle 100. The GPS device 230 can identify the current location of the electric vehicle 100 by way of trilateration. For example, the GPS device 230 can use trilateration to compute a location of the electric vehicle 100 by determining a distance of the electric vehicle from at least three GPS sources (e.g., the GPS sources 105A-105D) using GPS signals (e.g., the GPS signals 110A-110D). The GPS device 230 can determine the current location of the electric vehicle 100 by triangulation or any other suitable mechanism. The GPS device 230 can receive the GPS signals 110A-110D continuously (unless obstructed). The GPS device 230 can receive the GPS signals 110A-110D at a predetermined frequency, a predetermined distance traveled by the electric vehicle 100, or when predetermined conditions are satisfied.

In addition to determining the current location of the electric vehicle 100, the GPS device 230 can determine GPS signal quality. If the GPS device 230 is able to determine at least the LLA and YPR from the GPS signals 110A-110D, the GPS signal can be considered a "strong" GPS signal. Direct GPS signals can be considered a "strong" GPS signal. The current location of the electric vehicle 100 determined from a "strong" GPS signal can be considered accurate. If the GPS device 230 is unable to identify at least one of the LLA or YPR, that GPS signal can be considered "weak." Indirect or blocked GPS signals can be considered "weak" GPS signals. When the signal quality of the GPS signals 110A-1110D is "weak," the GPS device 230 can either be unable to identify the current location of the electric vehicle 100 or the current location identified by the GPS device can be inaccurate. The GPS signal quality can change dynamically. For example, when a previously obstructed GPS signal becomes unobstructed, the signal quality of that GPS signal can change (e.g., from "weak" to "strong"). When a previously unobstructed GPS signal becomes obstructed, the signal quality of that GPS signal can change (e.g., from "strong" to "weak").

The GPS device 230 can provide an indication of the signal quality to the data processing system 210. The GPS device 230 can set a flag indicative of the GPS signal quality. By setting the flag, the GPS device 230 can indicate to the data processing system 210 that the GPS signal quality is "weak." In some aspects, by setting the flag, the GPS device 230 can indicate to the data processing system 210 that the signal quality is "strong." The GPS device 230 can convey the signal quality data in other ways. In addition to the flag, the GPS device 230 can send the determined current location of the electric vehicle 100 to the data processing system 210. For example, the GPS device 230 can send the most recently determined LLA or YPR to the data processing system 210. The GPS device 230 can send time of day data, weather data, traffic data, any real-time updates, and other suitable data to the data processing system 210. The GPS device 230 can transmit data continuously to the data processing system 210. The GPS device 230 can transmit data to the data processing system 210 at a predetermined frequency, at every predetermined distance of travel by the electric vehicle 100, or when other predetermined conditions are satisfied.

The GPS device 230 can provide navigational capabilities to the electric vehicle 100. For example, the GPS device 230 can receive (e.g., via the user interface 250, a voice prompt, other input methods) a command to navigate the electric vehicle 100 to a destination location from a source location. The source location can be the current location. The GPS device can use the data from the GPS map 245 to determine a route from the source location to the destination location, and display the route on the user interface 250 or the mobile phone 225. The GPS device 230 can provide voice based commands using a microphone and speaker associated with the electric vehicle 100 to navigate.

The sensor system 235 can include one or more sensors that are associated with the electric vehicle 100. The one or more sensors can be mounted inside or outside the electric vehicle 100 in suitable locations. The one or more sensors can monitor a variety of conditions associated with the electric vehicle 100 and record sensor data associated with those conditions. Example sensors can include optic sensors such as cameras located inside or outside of the electric vehicle 100 to record current or real-time operating conditions of the electric vehicle. For example, front facing cameras mounted on the front of the electric vehicle 100 can record imagery for a predetermined field of view (e.g., distance of 200 meters) ahead of the electric vehicle. Rear facing cameras mounted on the rear of the electric vehicle 100 can record imagery for a predetermined field of view (e.g., distance of 30 meters) at the back of the electric vehicle. Other cameras can be mounted in or out of the electric vehicle 100 to monitor other types of imagery. The one or more sensors can include Light Detection, and Ranging ("LIDAR") sensors for providing three dimensional laser scanning in and around the electric vehicle 100. The one or more sensors can include other types of sensors that monitor various other operational features inside and outside the electric vehicle 100. The sensor system 235 can receive sensor data from each of the one or more sensors and send the sensor data to the data processing system 210.

The SIM card 240 can be considered a gateway for transactions occurring in the electric vehicle 100. Using the SIM card 240, the electric vehicle 100 can perform a variety of vehicle operations. The SIM card 240 can triangulate with cellphone towers. Thus, the SIM card 240 can be used to provide a current location of the electric vehicle 100 based on triangulation. For example, the SIM card 240 can track the current location of the electric vehicle 100 by measuring a time delay that a signal sent from the SIM card 240 takes to reach at least three cellphone towers and return back to the SIM card. Using cellphone triangulation, the SIM card 240 can determine a current location to within an area of about three quarters of a square mile. In densely populated urban areas, the cellphone towers can be close together, and a much closer estimation of the current location can be made than in rural areas, where the cellphone towers can be far apart. The SIM card 240 can determine the current location of the electric vehicle 100 in other ways. The current location determined by the SIM card 240 or by the GPS device 230 can be used to provide a variety of real-time updates and perform vehicle operations.

The GPS map 245 includes a map database that is stored within a memory 255A of the electric vehicle system 205. The electric vehicle 100 can use the GPS map 245 for navigation purposes. The GPS map 245 can be stored within a memory 255B of the data processing system 210. The GPS map 245 can be received (e.g., via an over-the-air update) either directly from a vendor or indirectly via the data processing system 210, which in turn can have received the GPS map from the vendor. The GPS map 245 can be high definition GPS map. The GPS map 245 can be periodically updated with any changes or modifications that are needed. For example, the nature of terrain is constantly changing due to a variety of factors (e.g., new buildings, roads are constructed, old buildings are demolished), which can render data in the GPS map 245 obsolete. To maintain the accuracy of the GPS map 245, the GPS map can be periodically updated. The GPS map 245 can be updated at a predetermined frequency. For example, the GPS map 245 can be updated every two weeks. The GPS map 245 can be updated at other predetermined frequencies. When localization errors are identified, the GPS map 245 can be updated at a higher frequency. In other words, the GPS map 245 can be updated more frequently when localization errors are identified. For example, if the GPS map 245 is updated every two weeks, the GPS map can be updated every week or at other more frequent time intervals when localization errors are identified.

The data processing system 210 can include a localization error determination system 260 that can identify geographic locations exhibiting localization errors. The localization error determination system 260 can dynamically identify localization errors. In other words, a geographic location that exhibits a localization error at a first time may not exhibit that localization error at a second time. To dynamically determine localization errors, the localization error determination system 260 can receive conditional data from a conditional data receiving system 265. The conditional data received from the conditional data receiving system 265 can include information such as time of day, weather/season/climate data, traffic data, terrain data, data received from the electric vehicle system 205, or any other data that can be considered useful or desirable to have by the localization error determination system 260 in determining localization errors. The conditional data receiving system 265 can receive the conditional data from one or more suitable sources (e.g., satellites, the electric vehicle system 205, remote servers, vendors).

In response to identifying a geographic location exhibiting a localization error by the localization error determination system 260, a localization error correction system 270 can generate supplemental GPS data associated with the geographic location. The supplemental GPS data can include supplemental data associated with the geographic location. For example, the localization error correction system 270 can generate the supplemental GPS data to include current location data determined from other sources. The localization error correction system 270 can use the current location determined by the SIM card 240 along with the GPS data to increase accuracy. The localization error correction system 270 can generate the supplemental GPS data to include current location data obtained from the cellphone 225 of the one or more users 220. The localization error correction system 270 can generate the supplemental GPS data to include current location data determined from the one or more sensors of the sensor system 235. The localization error correction system 270 can determine the current location from other sources for generating the supplemental GPS data. "GPS data" can include location data determined by the GPS device 230 or the data in the GPS map 245. For example, the GPS data can include LLA and YPR. GPS data can include signal quality data. The GPS data can include other or additional data points associated with a current location of the electric vehicle 100.

Based on the supplemental GPS data (e.g., the GPS data supplemented with supplemental data), a state of operation system 275 can determine if a change to a current operational state of the electric vehicle 100 is needed. The state of operation system 275 can monitor a current operational state of the electric vehicle 100. For example, the state of operation system 275 can monitor one or more Advanced Driver Assistance Systems ("ADAS") operations within the electric vehicle 100 based on real-time updates received from one or more systems (e.g., the data processing system 210, the GPS device 230, the one or more users 220, the cellphone 225, the localization error correction system 270, the SIM card 240). Example ADAS operations can include blind spot detection, lane departure detection and warning, lane correction, pedestrian detection and warning or avoidance, automatic or adaptive braking, traffic sign detection, traffic light detection, or other electric vehicle operations that measure relative distance, position, or speed between moving and static objects. The state of operation system 275 can determine a current driving control mode of the electric vehicle 100. For example, the state of operation system 275 can determine if the electric vehicle 100 is being driven in a level 0 or manual mode where the driver (e.g., the one or more users 220) manually operates/drives the electric vehicle, a level 1 mode where certain driver assistance features such as adaptive cruise control are available to the one or more users, a level 2 or partial driving automation mode where certain ADAS features can be available, a level 3 or conditional driving automation mode in which the electric vehicle 100 can be capable of making certain informed decisions, a level 4 or high driving automation mode in which the electric vehicle can operate in a self-driving mode in certain conditions, or a level 5 or full driving automation mode in which no to minimal human intervention is required to drive the electric vehicle.

The state of operation system 275 can determine if any change or adjustment to the current operational state of the electric vehicle 100 is needed. For example, the state of operation system 275 can determine that certain ADAS operations are unavailable or not working reliably. As another example, the state of operation system 275 can determine that the adaptive cruise control in the electric vehicle 100 has become unreliable or unsafe. The localization errors can impact the current operational state of the electric vehicle 100. For example, certain ADAS operations or other electric vehicle features that rely on or use the current location of the electric vehicle 100 can suffer when accurate current location is not available. In response to detecting that the current operational state of the electric vehicle 100 needs to be adjusted, the state of operation system 275 can facilitate a change in the current operational state of the electric vehicle.

In response to identifying localization errors by the localization error determination system 260, an updated GPS map requesting system 280 can request an update to the GPS map 245. The updated GPS map requesting system 280 can send a request to a vendor that provides the GPS map 245. The request can flag the geographic location as exhibiting a localization error and ask the vendor to provide an updated GPS map to replace the GPS map 245. By virtue of the update, a section of the GPS map associated with the geographic location exhibiting a localization error can be updated to identify the geographic location on the GPS map as exhibiting the localization error. The GPS map requesting system 280 can request GPS map updates to correct discrepancies between features detected by the sensor system 235 and the data in the GPS map 245. Any other or additional updates that can be considered suitable can be made to the GPS map 245.

In response to receiving the updated GPS map, the updated GPS map requesting system 280 can send the updated GPS map to the electric vehicle system 205 for replacing the GPS map 245. The updated GPS map requesting system 280 can request an update to the GPS map 245 based on a predetermined frequency. The updated GPS map requesting system 280 can request an update to the GPS map 245 each time a localization error is identified. In general, the GPS map 245 can be updated at a higher frequency when localization errors are identified than when no localization errors are identified to keep the GPS map updated.

The data processing system 210 includes a user interface 285 to communicate with the electric vehicle 100 over the network 215. Each of the electric vehicle system 205 and the data processing system 210 can include a memory and a processor. For example, the electric vehicle system can include the memory 255A and the data processing system 210 can include the memory 255B. The electric vehicle system 205 can include a processor 290A and the data processing system 210 can include a processor 290B. Each of the processor 290A and 290B can execute computer-readable instructions. Thus, the processor 290A, 290B can be include, or be associated with, a special purpose computer, logic circuits, or hardware circuits. The processor 290A, 290B can be implemented in hardware, firmware, software, or any combination thereof. The term "execute" is, for example, the process of running an application or the carrying out of the operation called for by an instruction. The instructions can be written using one or more programming language, scripting language, assembly language, and other programming languages. The processor 290A, 290B, thus, execute an instruction, meaning that they perform the operations called for by that instruction.

The processor 290A, 290B can be operably coupled to the memory 255A, 265B, respectively, to receive, send, and process information, and to control the operations of the underlying electric vehicle system 205 and the data processing system 210, respectively. The processor 290A, 290B can retrieve a set of instructions from the memory 255A, 255B, respectively, such as, from a permanent memory device like a read only memory ("ROM") device and copy the instructions in an executable form to a temporary memory device that is generally some form of random access memory ("RAM"). The processor 290A, 290B can include a single stand-alone processor, or a distributed set of processors that use the same or different processing technology. Although the processor 290A and 290B are shown as separate processors, a single processor can be shared by the electric vehicle system 205 and the data processing system 210.

With respect to the memory 255A, 255B, each of those can include a variety of types of memory devices. For example, either or both of the memory 255A, 255B can include, but is not limited to, any type of RAM, ROM, flash memory, magnetic storage devices (e.g., hard disk, floppy disk, magnetic strips, and other types of storage devices), optical disks (e.g., compact disk ("CD"), digital versatile disk ("DVD"), and other types of storage devices), smart cards, solid state devices, network accessible storage such as cloud storage, or any other type of memory that is suitable for use within the electric vehicle system 205 and the data processing system 210. Although the memory 255A and 255B are shown as separate memories, a single memory can be shared by the electric vehicle system 205 and the data processing system 210.

At least some elements of the data processing system 210 can be provided in a remote or backend server that is connected to a plurality of electric vehicles via a network (e.g., wireless network, cellular network, satellite communication, and other suitable communication networks). Each of the plurality of electric vehicles connected to such a remote or backend server can include an electric vehicle system (e.g., the electric vehicle system 205) for sending information to, and receiving information from, the data processing system. For example, the localization error determination system 260 can be located on the remote or backend server. The remote or backend server can also provide navigation instructions and GPS data to each of the plurality of electric vehicles. In some aspects, a third-party service for routing information or otherwise facilitating communication between the remote or backend server and the plurality of electric vehicles can be used. The remote server can be located on-premise, on a cloud, or a combination thereof. At least some elements of the data processing system 210 can be part of the electric vehicle 100 such that each electric vehicle has its own instance of those at least some elements. For example, the state of operation system 275 can be associated specifically with the electric vehicle 100. The data processing system 210 can include other or additional elements that can be considered desirable to have in performing the functions described herein.

Figure 3:
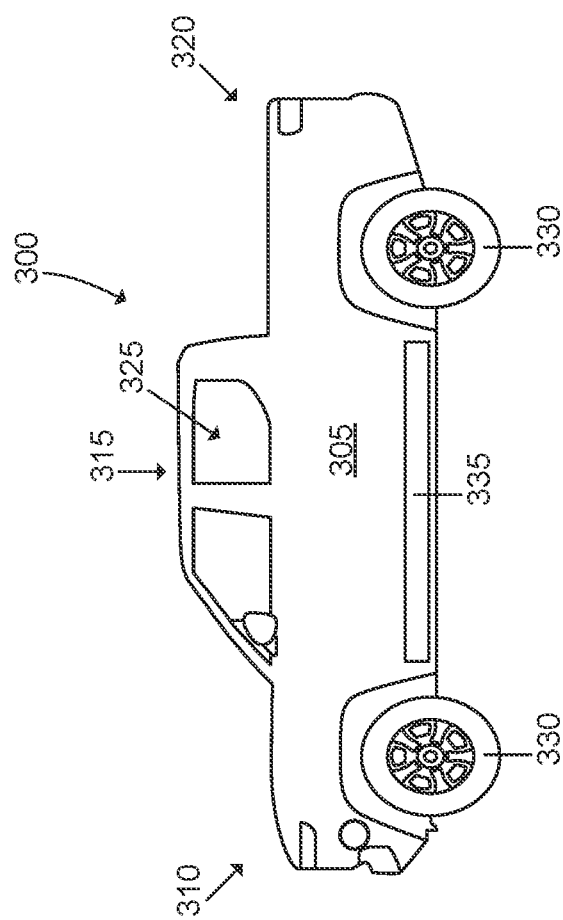
FIG. 3 depicts an example representation of the electric vehicle of FIG. 1, in accordance with some aspects.

FIG. 3 depicts an example electric vehicle 300, in accordance with some aspects. The electric vehicle 300 is an example of the electric vehicle 100. The electric vehicle 300 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The electric vehicle 300 can be fully electric or partially electric (e.g., plug-in hybrid) and can be fully autonomous, partially autonomous, or unmanned. The electric vehicle 300 can be human operated or non-autonomous.

The electric vehicle 300 can include a chassis 305 (e.g., a frame, internal frame, or support structure). The chassis 305 can support various components of the electric vehicle 300. The chassis 305 can span a front portion 310 (e.g., a hood or bonnet portion), a body portion 315, and a rear portion 320 (e.g., a trunk, payload, or boot portion). The body portion 315 of the electric vehicle 300 includes a passenger cabin 325 in which the one or more users 220 can be seated. The passenger cabin 325 can house one or more sensors of the sensor system 235, the user interface 250, the SIM card 240, and the GPS device 230. The passenger cabin 325 can house at least a portion of the memory 255A to store the GPS map 245. The passenger cabin 325 can house an interface to remotely access the memory 255A and retrieve the GPS map 245. The passenger cabin 325 can either house or include an interface to access the data processing system 210. At least some of the one or more sensors of the sensor system 235 can be located in the passenger cabin 325. At least some of the one or more sensors of the sensor system 235 can be located on an exterior of the electric vehicle 300 in suitable locations. The user interface 250 inside the passenger cabin 325 can be a graphical user interface including a display panel and one or more buttons, touchscreens, or other human interface devices (HMI) such as lights, speakers, or microphones. The passenger cabin 305 can house other or additional elements not described herein. The electric vehicle 300 can include other or additional components not described herein that can be needed to properly operate the electric vehicle.

The electric vehicle 300 can include a propulsion system including wheels 330 (only two of which are show) which are driven by one or more electric motors. One or more inverters or DC to DC converters can convert power between at least one battery pack 335, a charger, and the electric motors. For example, the inverter or DC to DC converter can charge the battery pack 335 (e.g., from a charger or a regenerative braking circuit), power the propulsion electric motor, or provide power to additional components of the passenger cabin 325 of the electric vehicle 300. The battery pack 335 can be installed or placed within the electric vehicle 300. For example, the battery pack 335 can be installed on the chassis 305 of the electric vehicle 300 within one or more of the front portion 310, the body portion 315, or the rear portion 320. The battery pack 335 can include a plurality of cells, cell balancing hardware, or a sensor suite reporting in the status of the battery pack and associated components. The battery pack 335 can store energy, and the operations of the at least one battery pack can be structured in response to a user preference or another communication. For example, a maximum and minimum charge state can be established which can be relevant to the wear of the cells of the battery or of other components. The battery cells of the battery pack 335 can include a thermal management system including a thermal management device. The battery pack 335 can, include, or be subdivided into modules or submodules which can include or be associated with battery cells and thermal management systems. The battery pack 335, module, or submodule can include a plurality of cells such as prismatic, cylindrical, rectangular, square, cubic, flat, or pouch form factor cells.

Figure 4:
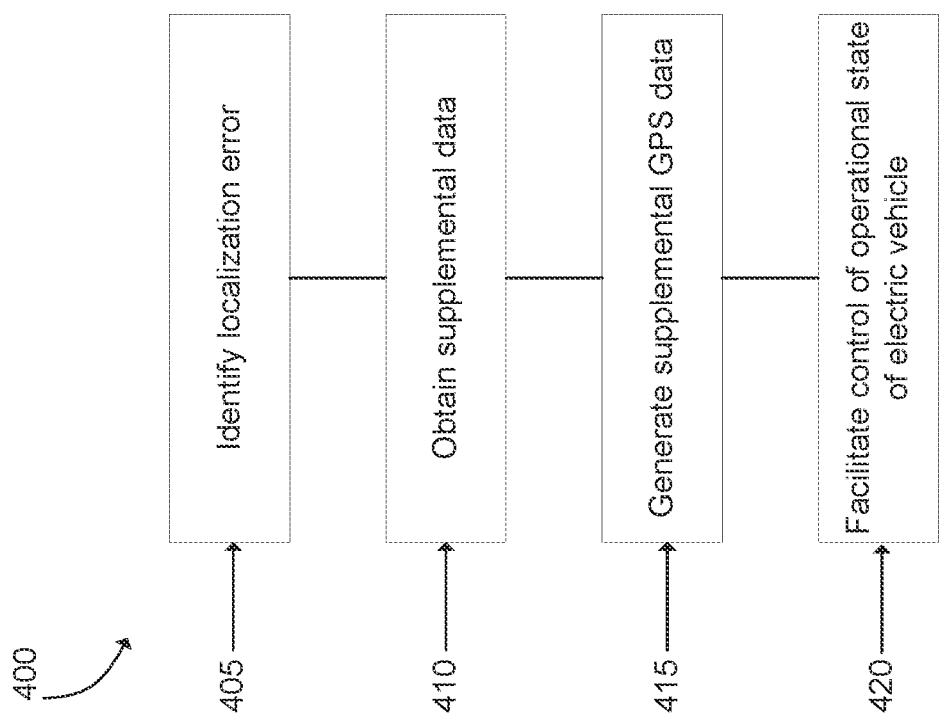
FIG. 4 depicts a flow diagram showing an example process by which information related to localization errors can be used and supplemented to change or maintain an operational state of the electric vehicle of FIG. 1, in accordance with some aspects.

FIG. 4 is an example flowchart outlining the operations of a process 400 for overcoming localization errors, in accordance with some aspects. The process 400 can include other or additional ACTS. The process 400 can be implemented by the electric vehicle system 205, the data processing system 210, or a combination of the electric vehicle system and the data processing system. In particular, the process 400 can be implemented by the processor 290A or the processor 290B.

At ACT 405, localization errors are identified. The data processing system 210, and particularly the localization error determination system 260, identifies a geographic location exhibiting a localization error. The geographic location and the localization error are identified based on GPS data. The process for identifying localization errors is explained in more detail with respect to FIG. 6. By determining that the geographic location exhibits a localization error, the data processing system 210 can determine that the GPS signals 110A-110D at the electric vehicle 100 are obstructed, and therefore, the current location of the electric vehicle 100 determined from those GPS signals can be inaccurate or missing.

At ACT 410, in response to identifying that the localization error, the data processing system 210 obtains supplemental data associated with the geographic location. The supplemental data can come from one or more sources.

For example, the data processing system 210 can determine location data for the geographic location from the SIM card 240 on the electric vehicle to obtain the supplemental data. The location data can include the current location of the electric vehicle 100. Specifically, the SIM card 240 can be used to triangulate with the cellphone towers to determine a current location of the electric vehicle 100 for the geographic location exhibiting the localization error. The data processing system 210 can receive location data, including the current location, from the SIM card 240 to supplement the GPS data.

The data processing system 210 can determine location data for the geographic location from the cellphone 225 of the one or more users 220 in the electric vehicle to obtain the supplemental data. The location data can include the current location of the electric vehicle 100. The cellphone 225 can have GPS capability to determine the current location of the electric vehicle 100. Each of the one or more users 220 can connect (e.g., through a wired or wireless connection) the cellphone 225 with the electric vehicle 100. For example, if the cellphone 225 and the electric vehicle 100 both have Bluetooth® capability, the one or more users 220 can pair their cellphone with the electric vehicle 100. The one or more users 220 can connect the cellphone 225 in other ways with the electric vehicle 100. In response to connecting the cellphone 225 with the electric vehicle 100, data can be transmitted between the cellphone and the electric vehicle. For example, the cellphone 225 can transmit location data to the data processing system 210. The data processing system 210 can then use the location data from the cellphone 225 for the geographic location to supplement the GPS data.

The one or more users 220 can include multiple users inside the electric vehicle 100, each of whom can have their own cellphone. The electric vehicle 100 can allow one or more of the multiple users to connect their cellphones with the electric vehicle to allow transmission of data (e.g., location data) between the electric vehicle and the cellphones. The location data from each of the connected cellphones can be transmitted to the data processing system 210, which can then supplement the GPS data with the location data.

The supplemental data can come from both the SIM card 240 and the cellphone 255. For example, the data processing system 210 can receive first location data for the geographic location from the SIM card 240 and second location data for the geographic location from the cellphone 225. The first location data and the second location data can each include the current location of the electric vehicle 100. The data processing system 210 can then correlate (e.g., cross-verify) the first location data and the second location data to determine a current location of the electric vehicle 100, which can then be used to supplement the GPS data. The sensor system 235 can provide real-time updates (e.g., LLA, YPR, vehicle acceleration) to the data processing system 210. For example, the photo sensors like cameras and LIDAR units mounted on the electric vehicle 100 can provide real-time updates to the data processing system 210. The data processing system 210 can determine a current location of the electric vehicle 100 based on sensor data received from the one or more sensors located on the electric vehicle to obtain the supplemental data. The data processing system 210 can use the real-time updates to triangulate the current location of the electric vehicle 100 for the geographic location. The data processing system 210 can then use such location data from the sensor system 235 to supplement the GPS data. The data processing system 210 can obtain the supplemental data including the the location data from the cellphone 255, the SIM card 240, or the sensor system 235 to supplement the GPS data.

Thus, the supplemental data to generate the supplemental GPS data can come from a variety of sources such as the cellphone 255, the SIM card 240, or the sensor system 235. The supplemental data can come from other or additional sources that are capable of providing location data (e.g., current location data or data from which a current location of the electric vehicle 100 can be determined) to the data processing system 210.

At ACT 415, the data processing system 210 generates supplemental GPS data associated with the geographic location. The supplemental GPS data can include the supplemental data associated with the geographic location as obtained in the ACT 410. To generate the supplemental GPS data, the data processing system 210 can replace at least the missing data in the GPS data with the supplemental data (e.g., location data). To generate the supplemental GPS data, the data processing system 210 can add (e.g., reinforce or augment) the GPS data to the supplemental data (e.g., location data). To generate the supplemental GPS data, the data processing system 210 can compare or correlate the supplemental data (e.g., location data) with the GPS data to determine a more accurate current location. For example, the data processing system 210 can compare the location data received from other source (e.g., SIM card 240, the cellphone 225, the sensor system 235) with a last known accurate location of the electric vehicle 100. Based on that comparison, the data processing system 210 can select either the location data from the other source or the GPS data. The data processing system 210 can use other or additional mechanisms to generate the supplemental GPS data.

At ACT 420, the data processing system 210 facilitates control of an operational state of the electric vehicle 100 based on the supplemental GPS data. The data processing system 210 can determine an operational state of the electric vehicle 100 based on the supplemental GPS data of the ACT 415. More specifically, the data processing system 210 can determine if a current operational state of the electric vehicle 100 can be maintained or if the current operational state needs to change. The data processing system 210 (e.g., the state of operation system 275) can determine a current operational state of the electric vehicle 100. For example, the data processing system 210 can determine which ADAS features are currently being used or are active. The data processing system 210 can determine a current driving control mode of the electric vehicle 100. Based upon the supplemental GPS data, the data processing system 210 can determine a suitable operational state in which the electric vehicle 100 can be operated. For example, in view of the supplemental GPS data, the data processing system 210 can determine that certain ADAS features may not be reliably used. In view of the supplemental GPS data, the data processing system 210 can determine that the electric vehicle 100 may not be operated in certain driving control modes. For example, the data processing system 210 can determine that the supplemental GPS data is still not accurate enough to reliably operate the electric vehicle 100 in adaptive cruise control or partial or full self-driving modes.

The data processing system 210 can compare the determined operational state of the electric vehicle 100 based on the supplemental GPS data with the current operational state of the electric vehicle. If the data processing system 210 determines that the current operational state of the electric vehicle 100 matches the determined operational state of the electric vehicle, the data processing system can maintain (or facilitate maintaining) the current operational state of the electric vehicle. If the data processing system 210 determines that the determined operational state of the electric vehicle 100 does not match the current operational state of the electric vehicle, the data processing system can change (or facilitate changing) the current operational state of the electric vehicle. For example, if the current operational state of the electric vehicle 100 is self-driving mode and the data processing system 210 determines, based on the supplemental GPS data, that the electric vehicle 100 cannot be reliably run on a self-driving mode, the data processing system 210 can determine that the current operational state (e.g., self-driving) of the electric vehicle needs to change. As another example, if the data processing system 210 determines that the current operational state of the electric vehicle 100 is a manual mode where the driver is manually driving the electric vehicle, and the data processing system determines, based on the supplemental GPS data, that the self-driving mode cannot be reliably used, the data processing system can determine that no change in the current operational state of the electric vehicle is needed because the electric vehicle is not running in a self-driving mode.

If the data processing system 210 determines that a change in the current operational state of operation is needed, the data processing system can facilitate the change in the current operational state of the electric vehicle 100. The data processing system 210 can send one or more notifications to the one or more users 220 via the user interface 250. For example, the data processing system 210 can display an alert on the user interface 250 of the electric vehicle 100 identifying the geographic location exhibiting the localization error and indicating that the current location data of the electric vehicle 100 can be inaccurate. The notification of the localization error can be sent at the ACT 405 when the localization error is identified. The data processing system 210 can indicate via the notification if the current operational state needs to change. For example, the notification can indicate that the electric vehicle 100 cannot be reliably operated in a self-driving mode and that the electric vehicle is switching to manual driving mode. The notification can indicate if any ADAS features are unavailable. The data processing system 210 can send another notification via the user interface 250 when the electric vehicle 100 exits the geographic region and the data processing system is able to accurately determine the current location of the electric vehicle again. The data processing system 210 can send other or additional notifications.

Figure 5:
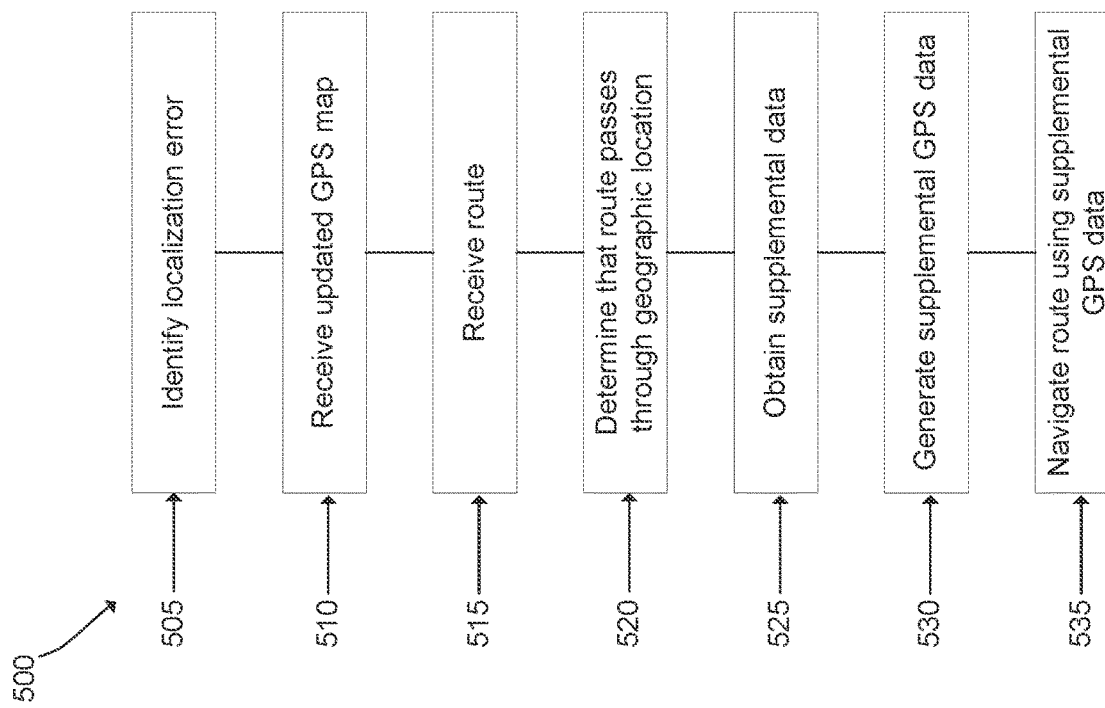
FIG. 5 depicts a flow diagram showing an example process by which the electric vehicle of FIG. 1 navigates when a route includes localization errors, in accordance with some aspects.

FIG. 5 is an example flowchart outlining the ACTS of a process 500 for navigating the electric vehicle 100 when a route includes one or more localization errors, in accordance with some aspects. The process 500 can include other or additional ACTS. The process 500 can be implemented by the electric vehicle system 205, the data processing system 210, or a combination of the electric vehicle system and the data processing system. In particular, the process 500 can be implemented by the processor 290A or the processor 290B.

At ACT 505, the data processing system 210, and particularly the localization error determination system 260, identifies a geographic location exhibiting a localization error. The data processing system 210 identifies the geographic location and the localization error based on GPS data. The process for identifying localization errors is explained in more detail with respect to FIG. 6. By determining that the geographic location exhibits a localization error, the data processing system 210 can determine that the GPS signals 110A-110D at the electric vehicle 100 are obstructed, and therefore, the current location of the electric vehicle 100 determined from those GPS signals can be inaccurate or missing.

At ACT 510, the data processing system 210 receives an updated version of the GPS map 245 identifying the geographic location as exhibiting the localization error. In response to identifying the localization error, the data processing system 210 can request an updated GPS map from the vendor. The updated GPS map can identify the geographic location as exhibiting the localization error. The ACT 510 can be optional as part of the process 500 and skipped. The ACT 510 can be performed during the process 400. The data processing system 210 can receive an updated GPS map and send the updated GPS map to the electric vehicle system 205 to replace the GPS map 245. The updated version of the GPS map 245 can then be used for navigational purposes. The ACTS 505 and 510 can be performed continuously, at a predetermined frequency, or when predetermined conditions are satisfied. By identifying geographic locations exhibiting localization errors and updating the GPS map 245 more frequently (e.g., at a higher frequency), reliability of navigational operations at the electric vehicle 100 can be improved.

At ACT 515, the data processing system 210 receives a route for navigation of the electric vehicle 100. When the one or more users 220 desire to navigate the electric vehicle 100 to a destination location, the one or more users 220 can input a destination location into the GPS device 230. For example, the one or more users 220 can input the address of the destination location or provide other information associated with the destination location. The one or more users 220 can input (e.g., by entering the address or other information of) the source location from where the navigation is to occur. The source location can be the current location of the electric vehicle 100. Based on the source location and the destination location, the data processing system 210 determines a route to navigate the electric vehicle 100 from the source location to the destination location.

At ACT 520, the data processing system 210 determines if the route passes through the geographic location identified at the ACT 505 as exhibiting a localization error. In response to identifying the localization error at the ACT 505 and determining that the route passes through the geographic location, at ACT 525, the data processing system 210 obtains supplemental data associated with the geographic location. The supplemental data can include location data determined from the cellphone 255, the SIM card 240, or the sensor system 235. At ACT 530, the data processing system 210 generates supplemental GPS data. The supplemental GPS data includes the supplemental data associated with the geographic location. Using the supplemental GPS data, the data processing system 210 can determine the current location of the electric vehicle 100 at the geographic region exhibiting the localization error and make any updates to the route as can be needed to navigate from the source location to the destination location based on the supplemental GPS data at ACT 535.

When the data processing system 210 determines that the route passes through one or more geographic locations having localization errors, the data processing system can alert the driver through the user interface 250 that there are possible zones or geographic locations where certain ADAs features can be unavailable, where mandatory driver intervention can be needed (e.g., electric vehicle control passed back to the driver), and any other information that is suitable can displayed.

Figure 6:
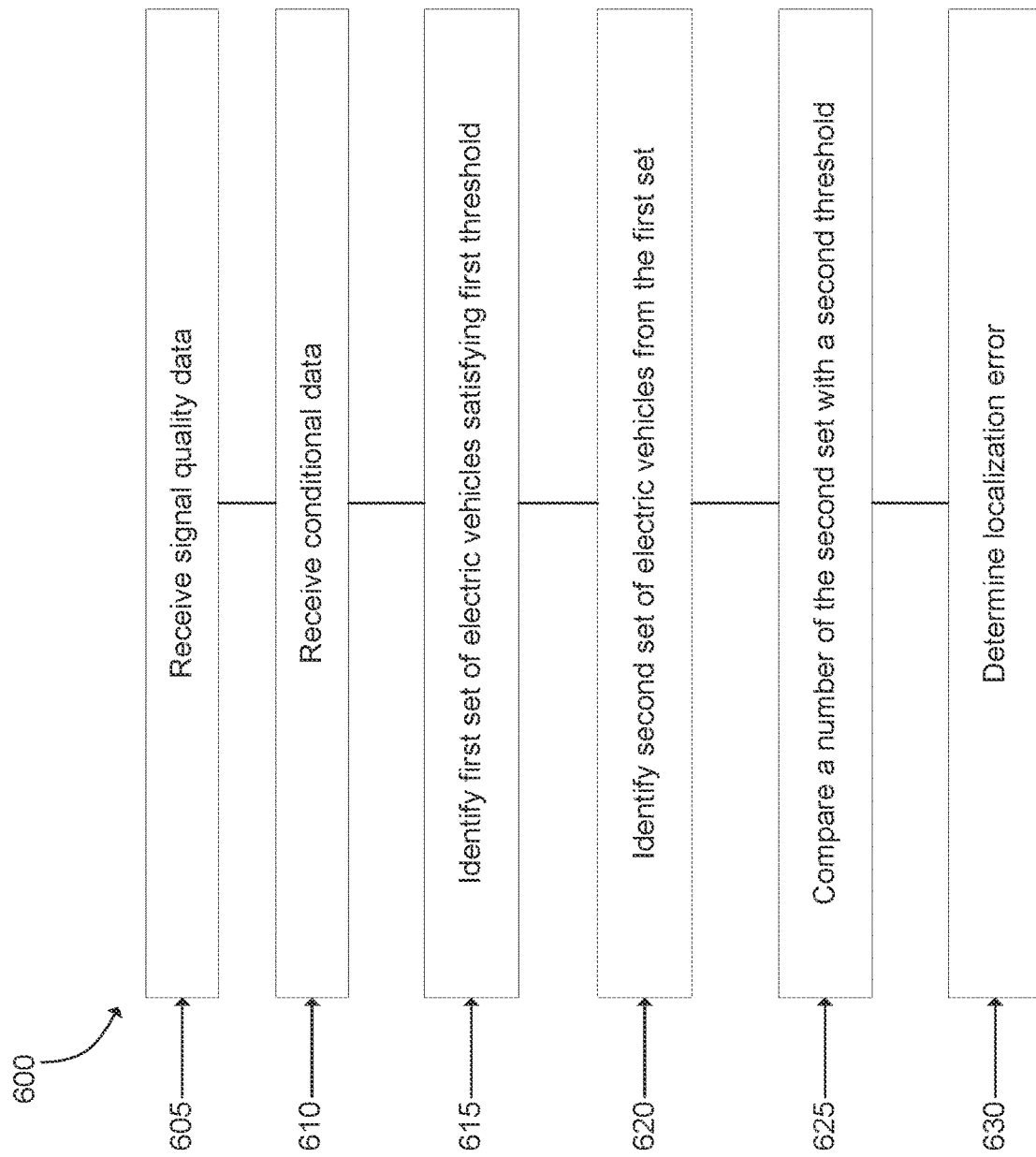
FIG. 6 depicts a flow diagram showing an example process by which the system of FIG. 2 dynamically identifies localization errors, in accordance with some aspects.

FIG. 6 is an example flowchart outlining the operations of a process 600 for identifying a geographic location exhibiting a localization errors, in accordance with some aspects. The process 600 can include other or additional ACTS. The process 600 can be implemented by the electric vehicle system 205, the data processing system 210, or a combination of the electric vehicle system and the data processing system. In particular, the process 600 can be implemented by the processor 290A or the processor 290B.

At ACT 605, the data processing system 210 receives signal quality data for a geographic location from each of a plurality of electric vehicles. The signal quality data can include at least a power level of the GPS signals 110A-110D. The data processing system 210 can receive the signal quality data from a plurality of electric vehicles, including the electric vehicle 100, that are physically at (or have at some point in time) the geographic location. Each of the plurality of electric vehicles can transmit signal quality data to the data processing system 210. Thus, the data processing system 210 receives a plurality of signal quality data from a plurality of electric vehicles.

At ACT 610, the data processing system 210 receives conditional data based on the signal quality data received for the geographic location. The conditional data can include data points such as the time of day that the signal quality data at the geographic location is collected, the date the signal quality data is collected at the geographic location, weather conditions at the geographic location on the day for which the signal quality data is collected, and traffic density at the geographic location at the time the signal quality data is collected. The conditional data can include other data items as well.

At ACT 615, the data processing system 210 identifies, based on the signal quality data received at the ACT 605, a first set of the plurality of electric vehicles that satisfy a first threshold. The first threshold can be predetermined. Specifically, the data processing system 210 determines, based on the signal quality data, which of the plurality of electric vehicles reported a GPS signal having a power level that is less than the first threshold. Localization errors can be dynamic in nature. A geographic location that exhibits a localization error at a first time may not exhibit the localization error at a second time. For example, the geographic location can exhibit a localization error in a first weather condition (e.g., cloudy day) but may not exhibit the localization error in a second weather condition (e.g., sunny day), for example, based upon the weather obstructing receipt of the GPS signals 110A-110D. As another example, the geographic location can exhibit a localization error in the morning (e.g., first time of day) but may not exhibit the localization error in the afternoon (e.g., second time of day), for example, due to a location of the GPS sources 105A-105D. Yet another example can be that the geographic location exhibits the localization error in a first season (e.g., winter) but does not exhibit a localization error in a second season (e.g., summer), for example, due to a location of the GPS sources 105A-105D. Thus, the localization errors can be dynamic.

Depending upon the conditions at the geographic location when an electric vehicle is at the geographic location, that electric vehicle may not have obstructed GPS signals. Thus, depending upon the signal quality of the GPS signal 110A-110D received at a particular electric vehicle at the geographic location, the data processing system 210 can receive a variety of signal quality data. For example, some electric vehicles can receive the GPS signals 110A-110D unobstructed and have no problem accurately determining the current location at the geographic location under some conditions, while other electric vehicles can have obstructed GPS signals and be unable to determine the current location at the geographic location under different conditions. The data processing system 210 compares a power level of each GPS signal with the first threshold to determine if a particular electric vehicle faced problems of obstructed GPS signals. If the power level of a GPS signal is less than the first threshold, the data processing system 210 determines that the electric vehicle that sent the signal quality data associated with that GPS signal faced an obstruction in the receipt of the GPS signal.

The data processing system 210 can identify all of the plurality electric vehicles that sent the signal quality data at the ACT 605 whose quality signal flag was set indicating that the respective GPS device was unable to determine at least one of the LLA or YPR, and therefore, their GPS signal was obstructed. Thus, the data processing system 210 can identify a first set of the plurality of electric vehicles that sent the signal quality data at the ACT 605 that have GPS signals having a power level that is less than the first threshold or those that have the quality signal set indicating at an obstructed GPS signal. Therefore, at the ACT 615, the data processing system 210 determines all of the plurality of electric vehicles that had obstructed GPS signals at the geographic location.

At ACT 620, the data processing system 210 identifies a second set of electric vehicles from the first set of electric vehicles that satisfy a condition based on the conditional data received at the ACT 610. Thus, the second set of electric vehicles are a subset of the first set of electric vehicles identified at the ACT 615. Specifically, at the ACT 615, the data processing system 210 identifies which of the plurality of electric vehicles reported obstructed GPS signals at the geographic location. At the ACT 620, the data processing system 210 dynamically determines the conditions causing localization errors. Since localization errors can be dynamic in nature, the data processing system 210 can determine if certain conditions are causing localization errors. Thus, the data processing system 210 considers conditional data received at the ACT 610 to account for the dynamic nature of the localization errors. For example, the data processing system 210 can identify the time of day for each electric vehicle in the first set of electric vehicles at which the GPS signal was obstructed. The data processing system 210 can identify the weather condition for each electric vehicle in the first set of electric vehicles during which the GPS signal was obstructed. The data processing system 210 can identify the season for each electric vehicle in the first set of electric vehicles during which the GPS signal was obstructed. The data processing system 210 can identify the traffic condition for each electric vehicle in the first set of electric vehicles during which the GPS signal was obstructed. The data processing system 210 can identify other conditions for each electric vehicle in the first set of electric vehicles during which the GPS signal was obstructed.

In response to associating signal quality data from each electric vehicle in the first set with the conditional data, the data processing system 210 can categorize the electric vehicles in the first set based on the conditional data. For example, to determine if localization errors are occurring on a particular time of day, the data processing system 210 can categorize the electric vehicles in the first set based on the time of day at which the GPS signals in each of those electric vehicles was obstructed. The data processing system 210 can classify the electric vehicle in the first set based on a morning, afternoon, evening, and night time of day categorization. With such a categorization, the data processing system 210 can have a first classification including all the electric vehicles in the first set that reported GPS obstruction in the morning, a second classification including all the electric vehicles in the first set that reported GPS signal obstruction in the afternoon, a third classification including all the electric vehicles in the first set that reported GPS signal obstruction in the evening, and a fourth classification including all electric vehicles in the first set that reported GPS signal obstruction in the night. The hours that span morning, afternoon, evening, and night can be predetermined. Other classifications for a time of day can be used. Each of the first to fourth classifications can be considered a second set of electric vehicles selected from the first set.

When the conditional data being considered is season, the data processing system 210 can classify the electric vehicles in the first set based on the season. For example, if the season is classified as spring, summer, fall, and winter, the data processing system 210 can categorize the electric vehicles in the first set based on reported GPS signal obstruction in the months spanning spring, summer, fall, and winter. The months that span spring, summer, fall, and winter can be predetermined. If the conditional data being considered is weather, the data processing system 210 can classify the electric vehicles in the first set based on the weather. For example, if the weather is classified as sunny, rainy, foggy, or snowy, the data processing system 210 can identify which electric vehicles in the first set reported GPS signal obstruction in sunny, rainy, foggy, or snowy weather. Weather conditions that can be considered sunny, rainy, foggy, or snowy can be predetermined. Thus, the data processing system can classify the electric vehicles in the first set based on a variety of conditional data that is to be considered for dynamically identifying localization errors. The data processing system 210 can consider multiple conditions when identifying the second set of electric vehicles. For example, the data processing system 210 can consider both the time of day and the weather.

At ACT 625, the data processing system 210 compares a number of the plurality of electric vehicles in the second set with a second threshold. The second threshold can be predetermined. The data processing system 210 determines a number of electric vehicles in the second set identified at the ACT 620. For example, if the conditional data being considered is time of day, based on the conditions of morning, afternoon, evening, and night, the data processing system 210 can determine the number of electric vehicles from the first set determined at the ACT 615 which reported GPS signal obstruction in each of morning, afternoon, evening, and night to determine the second set of the ACT 620. The data processing system 210 can then count the number of electric vehicles in the second set (e.g., all the electric vehicles that reported GPS signal obstruction in the morning) with the second threshold. If the number of electric vehicles in the second set is greater than or equal to the second threshold, the data processing system 210 determines that the geographic location exhibits a localization error at that time of day at ACT 630. For example, if the number of electric vehicles that reported a GPS signal obstruction in the morning is greater than or equal to the second threshold, the data processing system 210 can determine that the geographic location exhibits a localization error in the morning. The data processing system 210 can dynamically determine and predict which conditions cause localization errors at the geographic location.

Figure 7:
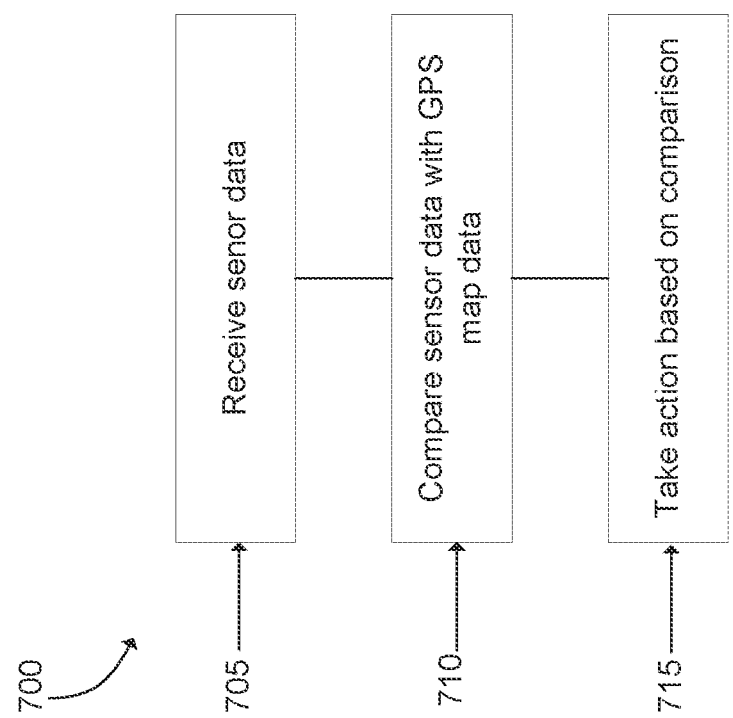
FIG. 7 depicts a flow diagram showing an example process by which the system of FIG. 2 dynamically identifies discrepancies between sensor data and GPS map data, in accordance with some aspects.

FIG. 7 is an example flowchart outlining the operations of a process 700 for GPS map updates based on real-time updates, in accordance with some aspects. The process 700 can include other or additional ACTS. The process 700 can be implemented by the electric vehicle system 205, the data processing system 210, or a combination of the electric vehicle system and the data processing system. In particular, the process 700 can be implemented by the processor 290A or the processor 290B.

The GPS map 245 is periodically updated (e.g., every two weeks or sooner when localization errors are identified). Even with the frequent updates to the GPS map 245, the GPS map can be out of date due to the vast network of roads that need to be updated and covered in each update, as well as the constant changing nature of the terrain and roads. For example, the number of lanes on a particular road can have changed since the last update to the GPS map 245, the speed limits can have changed, previously existing lanes can have closed due to various reasons such as construction or road work, traffic signs could have changed, traffic lights could have changed, roads and highways can change, and other traffic, road, and terrain related changes could have happened. Other changes to the features such as roads, lanes, highways, and terrain that are mapped in the GPS map 245 can change. When such changes are not reflected in the GPS map 245, the GPS map can become out of date and unreliable. Thus, the data in the GPS map 245 can be reinforced with real-time data being sensed by the sensor system 235.

At ACT 705, the data processing system 210 receives sensor data from the sensor system 235 of a plurality of electric vehicles. The sensor data can include real-time data captured by the one or more sensors (e.g., camera sensors) of the electric vehicle 100. For example, a front camera mounted towards the front of the electric vehicle 100 can detect a number of lanes on a road being traveled by the electric vehicle in a defined field of view of the front camera. The front camera can send the detected number of lanes to the data processing system 210. The sensors on the electric vehicle 100 can detect other parameters as well such as speed limit, types of lanes (e.g., high occupancy vehicle lanes, bicycle lanes, shoulders, flex lanes, and other types of lanes), traffic signs, traffic lights, and other features of the road and surrounding areas in the sensors' field of view as the electric vehicle 100 drives around. Thus, the data processing system 210 can receive a variety of sensor data from a plurality of electric vehicles.

At ACT 710, the data processing system 210 compares the sensor data for a particular geographic location with the data on the GPS map 245. For example, for a section of Road A, the data processing system 210 can compare the sensor data received for that section of Road A from one or more electric vehicles with the data from the GPS map 245 (referred to herein as map data) for that same section of Road A. The data processing system 210 determines if there is a discrepancy between the sensor data and the map data. For example, if the sensor data for the section of Road A indicates four 4 lanes while the map data indicates 3 lanes, the data processing system 210 can determine that a discrepancy exists between the sensor data and the map data. On the other hand, if the data processing system 210 determines that both the sensor data and the map data indicate 4 lanes in the section of Road A, the data processing system can determine that there is no discrepancy between the sensor data and the map data. Thus, the data processing system 210 determines that there is a discrepancy between the sensor data and the map data when the sensor data does not match the map data.

To reduce potential erroneous sensing by the sensors, the data processing system 210 can determine that there is a discrepancy between the sensor data and the map data when greater than or equal to a predetermined threshold number of electric vehicles report the same discrepancy. Thus, if the data processing system 210 determines that X % of electric vehicles within a predetermined time period (e.g., 24 hours) have reported the same sensor data that is different from the map data, the data processing system can then flag that geographic location as exhibiting a discrepancy. For example, if X % of the electric vehicles report that a section of Road A has 4 lanes while the map data indicates 3 lanes, the data processing system 210 can determine that a discrepancy exists.

At ACT 715, the data processing system 210 takes an action in response to finding a discrepancy between the sensor data and the map data. In response to finding a discrepancy between the sensor data and the map data, the data processing system 210 flags the geographic location as exhibiting a discrepancy and shares the geographic location with the map vendor to update the GPS map 245. The update to the GPS map 245 can correct the discrepancy. For example, if the discrepancy is in the number of lanes, the update can request the GPS map to reflect the number of lanes reported in the sensor data.

In response to finding a discrepancy between the sensor data and the map data, the data processing system 210 can reinforce the map data with the sensor data. The data processing system 210 can replace the map data of the geographic location impacted by the discrepancy with the data from the sensors. For example, if the discrepancy exists in the number of lanes in a section of Road A, the data processing system 210 can override the map data with the sensor data and show the number of lanes in that section of Road A as reported by the sensor data. The data processing system 210 can determine that the sensor data is inaccurate for some reason. In such cases, the data processing system 210 continue using the map data even if there is a discrepancy between the map data and the sensor data. Thus, the data processing system 210 can override the sensor data and continue using the map data.

Figure 8:
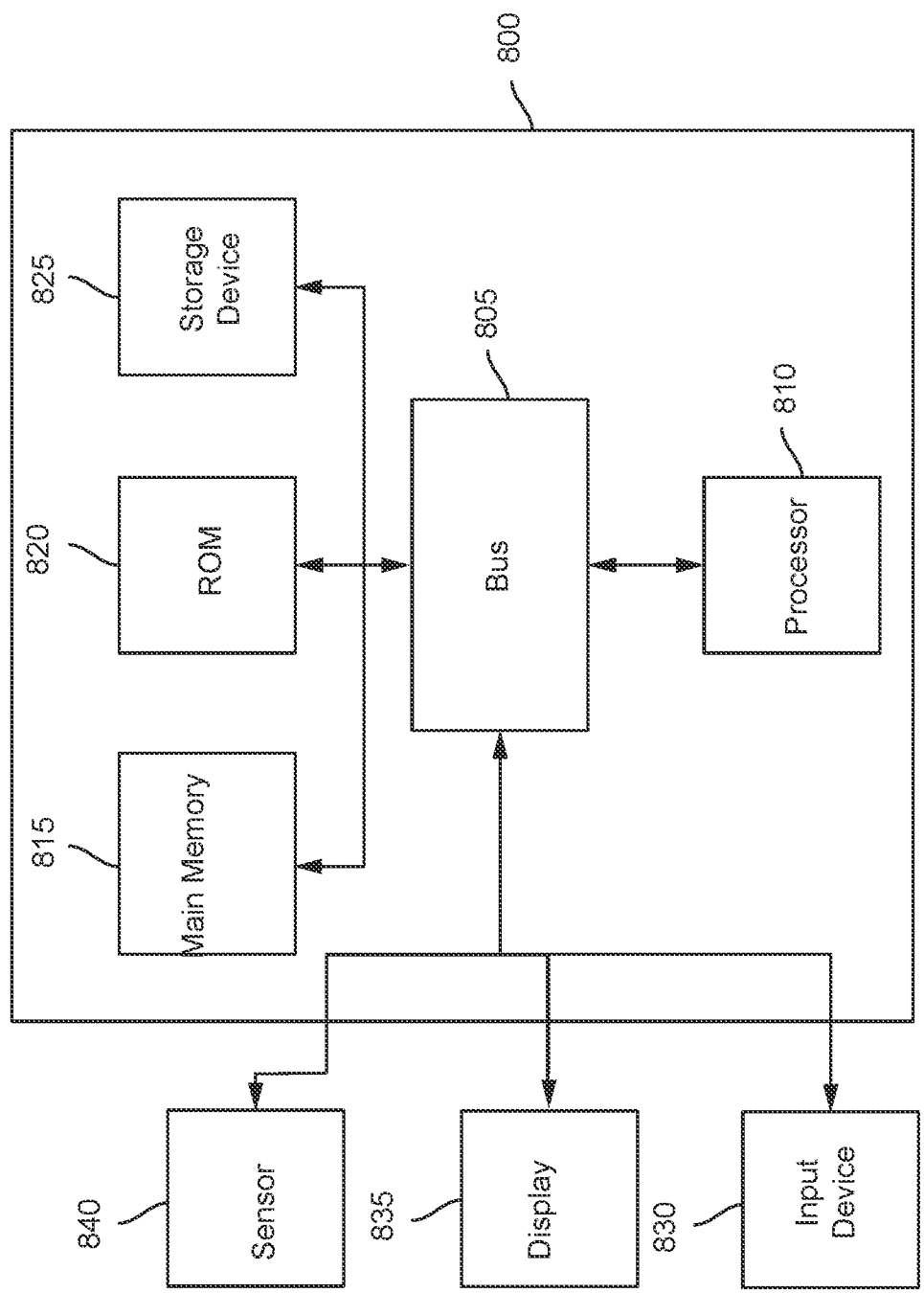
FIG. 8 is an example block diagram illustrating an architecture for a computer system that can be employed to implement elements of the systems and methods described and illustrated herein.

FIG. 8 depicts a block diagram of an example computer system 800. The computer system 800 is a computing device that can include or be used to implement a data processing system or its components. The computer system 800 includes at least one bus 805 or other communication component for communicating information and at least one processor 810 or processing circuit coupled to the bus 805 for processing information. The computer system 800 includes at least one main memory 815, such as a random access memory (RAM) or other dynamic storage device, coupled to the bus 805 for storing information, and instructions to be executed by the at least one processor 810. The main memory 815 can be used for storing information during execution of instructions by the at least one processor 810. The computer system 800 can include at least one read only memory (ROM) 820 or other static storage device coupled to the bus 805 for storing static information and instructions for the at least one processor 810. A storage device 825, such as a solid state device, magnetic disk or optical disk, can be coupled to the bus 805 to persistently store information and instructions.

The computer system 800 can be coupled via the bus 805 to an input device 830, a display 835, and a sensor 840. The input device 830, such as a keyboard or voice interface, can be coupled to the bus 805 for communicating information and commands to the at least one processor 810. The input device 330 can include a touch screen display (e.g., the display 835). The input device 830 can include a cursor control, such as a mouse, a trackball, or cursor direction keys, for communicating direction information and command selections to the at least one processor 810 and for controlling cursor movement on the display 335. The display 835 can be, for example, a liquid crystal display, or active matrix display, for displaying information to a user such as a driver of the electric vehicle 100 or other end user.

The processes, systems and methods described herein can be implemented by the computer system 800 in response to the at least one processor 810 executing an arrangement of instructions contained in the main memory 815. Such instructions can be read into the main memory 815 from another computer-readable medium, such as the storage device 825. Execution of the arrangement of instructions contained in the main memory 815 causes the computer system 800 to perform the illustrative processes described herein. One or more processors in a multi-processing arrangement can be employed to execute the instructions contained in the main memory 815. Hard-wired circuitry can be used in place of or in combination with software instructions together with the systems and methods described herein. Systems and methods described herein are not limited to any specific combination of hardware circuitry and software.

Although an example computer system has been described in FIG. 8, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or aspect, and references to "an implementation," "some implementations," "one implementation" or the like are not necessarily mutually exclusive and are intended to indicate that a particular feature, structure, or characteristic described in connection with the implementation may be included in at least one implementation or aspect. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The invention claimed is:

1. A system, comprising:
a data processing system comprising one or more processors, coupled with memory to:
identify a geographic location with a localization error, wherein the geographic location is identified based on global positioning system (GPS) data and the localization error is determined based on classification of vehicles with the localization error and conditional data associated with the identified geographic location;
determine that a power level of a GPS signal associated with the GPS data at the geographic location is less than a threshold to identify that the geographic location exhibits the localization error;
in response to identifying the localization error, obtain supplemental data associated with the geographic location;
generate supplemental GPS data associated with the geographic location, wherein the supplemental GPS data includes the supplemental data associated with the geographic location;
facilitate control of an operational state of a vehicle based on the supplemental GPS data, the facilitation comprising restricting an operation of a plurality of operations of an advanced driver assistance system (ADAS), the plurality of operations comprising an adaptive cruise control operation, partial driving automation mode, or full driving automation mode; and
display an alert on a user interface of the vehicle identifying a change in operational state of the vehicle.

2. The system of claim 1, comprising the data processing system to:
determine that a current operational state of the vehicle matches a determined operational state of the vehicle based on the supplemental GPS data; and
maintain the current operational state of the vehicle.

3. The system of claim 1, comprising the data processing system to:
determine that a current operational state of the vehicle is different from a determined operational state of the vehicle based on the supplemental GPS data; and
change the current operational state of the vehicle.

4. The system of claim 1, wherein the ADAS comprises an adaptive cruise control system (ACC), and the restriction comprises inhibiting operation of the ACC.

5. The system of claim 1, comprising the data processing system to:
determine that the geographic location exhibits the localization error at a first time of day and does not exhibit the localization error at a second time of day.

6. The system of claim 1, comprising the data processing system to:
determine that the geographic location exhibits the localization error in a first season and does not exhibit the localization error in a second season.

7. The system of claim 1, comprising the data processing system to:
determine that the geographic location exhibits the localization error in a first weather condition and does not exhibit the localization error in a second weather condition.

8. The system of claim 1, comprising the data processing system to:
determine location data for the geographic location from a subscriber identification module on the vehicle to obtain the supplemental data.

9. The system of claim 1, comprising the data processing system to:
determine location data for the geographic location from a mobile network of a cellphone of a user in the vehicle to obtain the supplemental data.

10. The system of claim 1, comprising the data processing system to:
determine a current location of the vehicle based on sensor data received from at least one sensor located on the vehicle to obtain the supplemental data.

11. The system of claim 1, comprising the data processing system to:
receive sensor data from at least one sensor located on the vehicle for the geographic location;
compare the sensor data with GPS map data from a GPS map available to the vehicle; and
override the GPS map data with the sensor data responsive to determining a discrepancy between the sensor data and the GPS map data.

12. The system of claim 1, comprising the data processing system to:
receive an updated GPS map identifying the geographic location as exhibiting the localization error.

13. The system of claim 1, comprising the data processing system to:
display an alert on the user interface of the vehicle identifying the geographic location exhibiting the localization error.

14. A method, comprising:
identifying, by a data processing system comprising one or more processors coupled with a memory, a geographic location with a localization error, wherein the geographic location is identified based on global positioning system (GPS) data and the localization error is determined based on classification of vehicles with the localization error and conditional data associated with the identified geographic location;
determining that a power level of a GPS signal associated with the GPS data at the geographic location is less than a threshold to identify that the geographic location exhibits the localization error;

in response to identifying the localization error, obtaining, by the data processing system, supplemental data associated with the geographic location;

generating, by the data processing system, supplemental GPS data associated with the geographic location, wherein the supplemental GPS data includes the supplemental data associated with the geographic location;

facilitating, by the data processing system, control of an operational state of a plurality of operational states of a vehicle based on the supplemental GPS data, the facilitation comprising enabling an advanced driver assistance system (ADAS), the plurality of operational states comprising an adaptive cruise control of operation, a partial driving automation mode, and a full driving automation mode; and displaying, by the data processing system, an alert on a user interface of the vehicle identifying a change in operational state of the vehicle.

15. The method of claim 14, wherein enabling the ADAS comprises permitting the operation of an ACC.

16. The method of claim 14, comprising:
determining, by the data processing system, that the geographic location exhibits the localization error at a first time and does not exhibit the localization error at a second time.

17. The method of claim 14, comprising:
determining, by the data processing system, location data for the geographic location from another source for obtaining the supplemental data.

18. A system, comprising:
a data processing system comprising one or more processors, coupled with memory to:
identify a geographic location exhibiting a localization error, wherein the geographic location is identified based on global positioning system (GPS) data and the localization error is determined based on classification of vehicles with the localization error and conditional data associated with the identified geographic location;

determine that a power level of a GPS signal associated with the GPS data at the geographic location is less than a threshold to identify that the geographic location exhibits the localization error;

determine that a route of a vehicle passes through the geographic location;

in response to identifying the localization error and determining that the route passes through the geographic location, obtain supplemental data associated with the geographic location;

generate supplemental GPS data associated with the geographic location, wherein the supplemental GPS data includes the supplemental data associated with the geographic location;

navigate the route according to an operational state of the vehicle, wherein the operational state comprises a restriction for an operation of a plurality of operations of an advanced driver assistance system (ADAS), based on the supplemental GPS data, the plurality of operations comprising an adaptive cruise control operation, partial driving automation mode, or full driving automation mode; and display an alert on a user interface of vehicle identifying a change in operational state of the vehicle.

19. The system of claim 18, comprising the data processing system to:
display an alert on the user interface of the vehicle identifying the geographic location exhibiting the localization error.

20. The system of claim 18, comprising the data processing system to:
determine location data for the geographic location from another source for obtaining the supplemental data.

* * * * *